United States Patent
Patten

(10) Patent No.: US 10,311,998 B2
(45) Date of Patent: Jun. 4, 2019

(54) HIGH-ELONGATION TENSILE CABLE WITH UNDULATING TRANSMISSION CABLE

(71) Applicant: Makani Technologies LLC, Alameda, CA (US)

(72) Inventor: Elias Wolfgang Patten, Seattle, WA (US)

(73) Assignee: Makani Technologies LLC, Alameda, CA (US)

(*) Notice: Subject to any disclaimer, the term of this patent is extended or adjusted under 35 U.S.C. 154(b) by 0 days.

(21) Appl. No.: 16/130,187

(22) Filed: Sep. 13, 2018

(65) Prior Publication Data

US 2019/0103202 A1   Apr. 4, 2019

Related U.S. Application Data

(60) Provisional application No. 62/567,464, filed on Oct. 3, 2017.

(51) Int. Cl.
| | | |
|---|---|---|
| H01B 7/04 | (2006.01) | |
| H01B 7/18 | (2006.01) | |
| H02K 7/18 | (2006.01) | |
| H01B 9/00 | (2006.01) | |

(52) U.S. Cl.
CPC ............ *H01B 7/043* (2013.01); *H01B 7/18* (2013.01); *H01B 9/006* (2013.01); *H02K 7/183* (2013.01)

(58) Field of Classification Search
CPC .......... H01B 7/043; H01B 7/18; H01B 9/006; H02K 7/183
USPC ....................................................... 174/113 R
See application file for complete search history.

(56) References Cited

U.S. PATENT DOCUMENTS

| | | | | |
|---|---|---|---|---|
| 4,630,887 A | * | 12/1986 | Taylor .............. | B29D 11/00663 174/117 F |
| 4,679,897 A | * | 7/1987 | Driskel ................ | G02B 6/4416 174/70 R |
| 4,726,314 A | * | 2/1988 | Ayers .................... | B63B 21/663 114/243 |
| 4,810,834 A | * | 3/1989 | Grogl ..................... | H01B 7/183 174/121 R |
| 2004/0165844 A1 | * | 8/2004 | Kim ..................... | G02B 6/4488 385/104 |

* cited by examiner

*Primary Examiner* — Timothy J Thompson
*Assistant Examiner* — Charles Pizzuto
(74) *Attorney, Agent, or Firm* — McDonnell Boehnen Hulbert & Berghoff LLP

(57) ABSTRACT

Tensile cables with transmission cables arranged in undulating paths are described. The tensile cables include deformable supports that define the undulating paths and deform in response to a tension force exerted on opposing ends of the transmission cables.

19 Claims, 12 Drawing Sheets

SECTION A-A

SECTION B-B

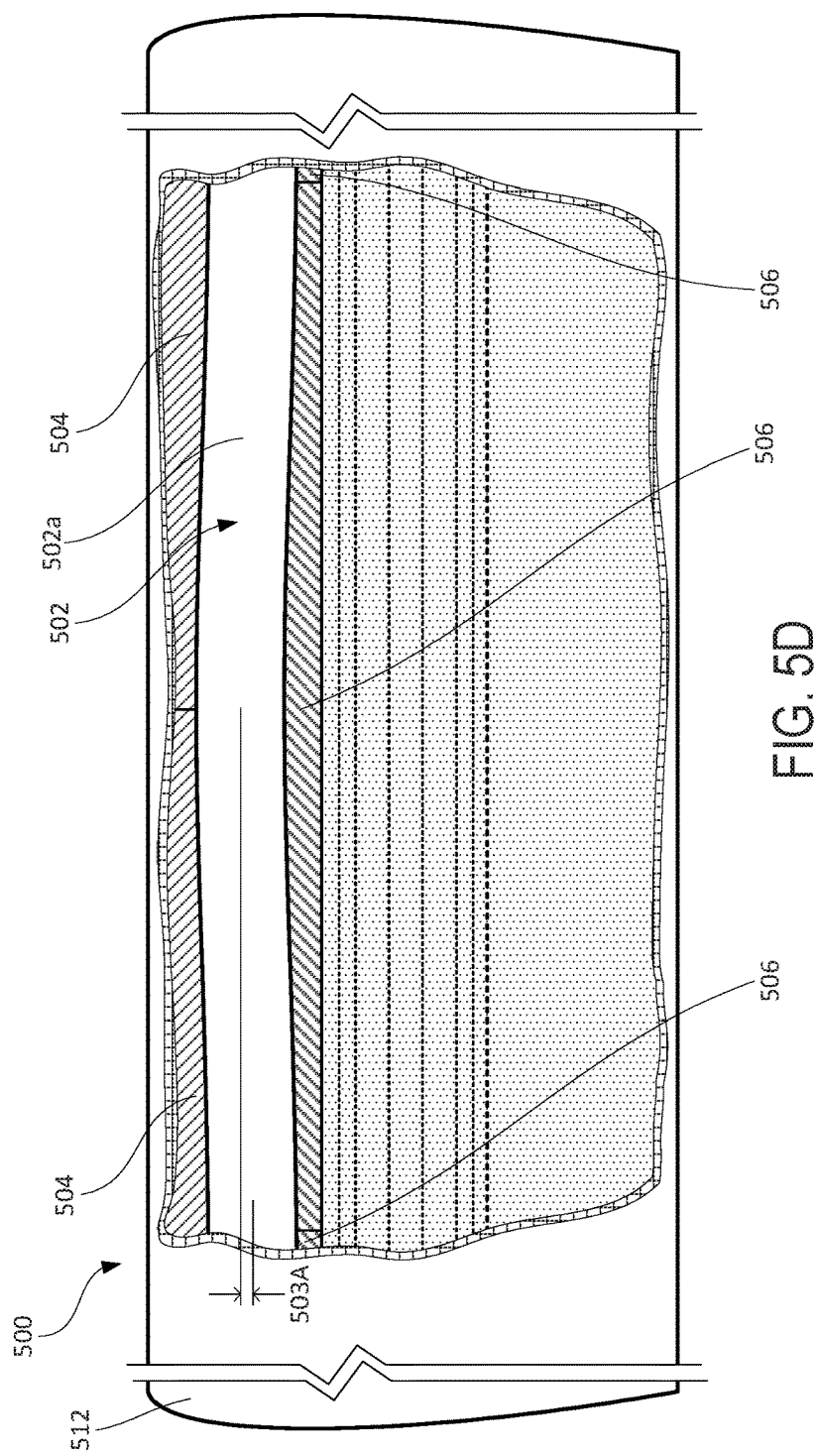

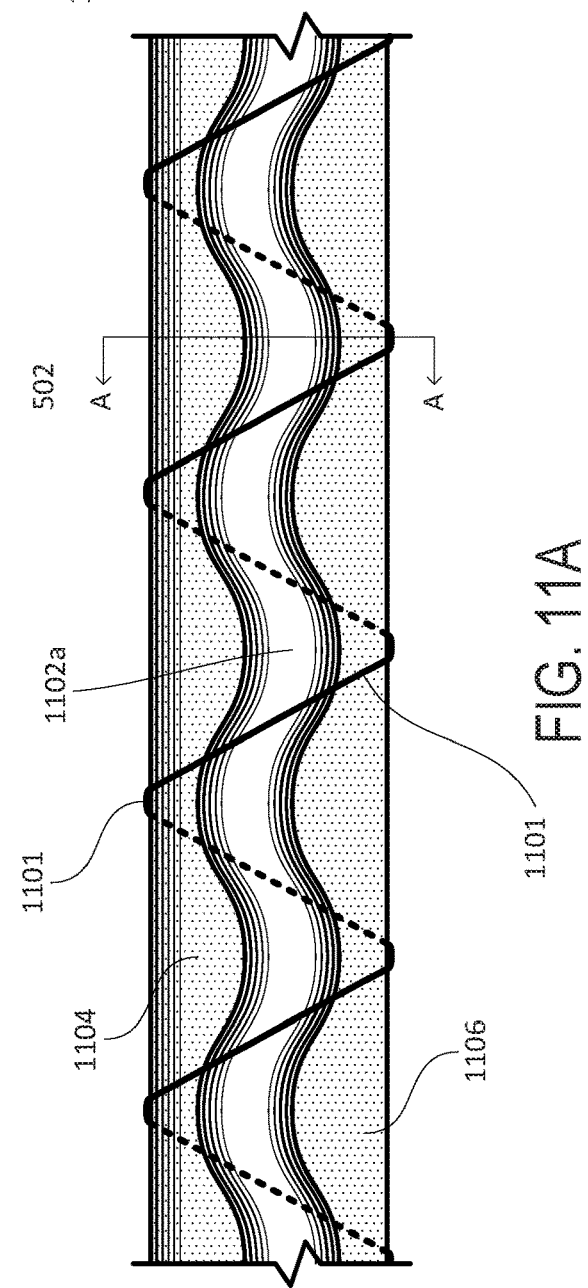

HIGH-ELONGATION TENSILE CABLE WITH UNDULATING TRANSMISSION CABLE

CROSS REFERENCE TO RELATED APPLICATION

This application claims priority to U.S. Patent Application No. 62/567,464, filed on Oct. 3, 2017, which is incorporated herein by reference in its entirety and for all purposes.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Tensile cables with electrical conductors in undulating lay patterns and supports to aid the lay pattern are described herein.

In one aspect, a tensile cable may include a strength core arranged longitudinally within the tensile cable, a transmission cable arranged in an undulating path within the tensile cable, wherein an amplitude and a wavelength of the undulating path vary in relation to a force acting on the transmission cable, a first deformable support disposed between the transmission cable and the strength core, and a second deformable support disposed between the transmission cable and an outer layer of the tensile cable. The first and second deformable supports may be configured to provide mechanical support that at least partially defines the undulating path of the transmission cable, and at least one of the first deformable support or the second deformable support may be configured to reversibly deform in response to changes in the amplitude along a length of the transmission cable.

In another aspect, a tensile cable may include a strength core arranged longitudinally within the tensile cable, a transmission cable arranged in an undulating path within the tensile cable, wherein an amplitude and a wavelength of the undulating path vary in relation to a force acting on the transmission cable, a first deformable support disposed between the transmission cable and a first interior surface of the tensile cable, and a second deformable support disposed between the transmission cable and a second interior surface of the tensile cable, wherein the second interior surface is disposed opposite the first interior surface. The first and second deformable supports may be configured to provide mechanical support that at least partially defines the undulating path of the transmission cable, and at least one of the first deformable support or the second deformable support may be configured to reversibly deform in response to changes in the amplitude along a length of the transmission cable.

In another aspect, a tensile cable may include a strength core arranged longitudinally within the tensile cable, a transmission cable arranged in an undulating path within the tensile cable, wherein an amplitude and a wavelength of the undulating path vary in relation to a force acting on the transmission cable, a first plurality of deformable supports disposed between the transmission cable and a first interior surface of the tensile cable, and a second plurality of deformable supports disposed between the transmission cable and a second interior surface of the tensile cable, wherein the second interior surface is disposed opposite the first interior surface. The first and second pluralities of deformable supports may be configured to provide mechanical support that at least partially defines the undulating path of the transmission cable, and at least some of the deformable supports may be configured to reversibly deform in response to changes in the amplitude along a length of the transmission cable.

In another aspect, a tensile cable may include a strength core arranged longitudinally within the tether, an elongated cavity disposed within the tether, wherein the elongated cavity defines a transverse long axis and a transverse short axis orthogonal to the transverse long axis, and a transmission cable disposed within the elongated cavity, wherein the transmission cable is arranged in an undulating path, wherein an amplitude of the undulating path varies along the transverse long axis in relation to a force acting on the transmission cable, wherein the transmission cable is constrained from movement within the elongated cavity along the transverse short axis.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 5D depicts a partial cutaway view of a tensile cable in a tensioned condition, according to an example embodiment.

FIGS. 11A and 11B depict a side view and section view, respectively, of a binding arrangement for use in a tensile cable, according to an example embodiment.

DETAILED DESCRIPTION

Figure 1:
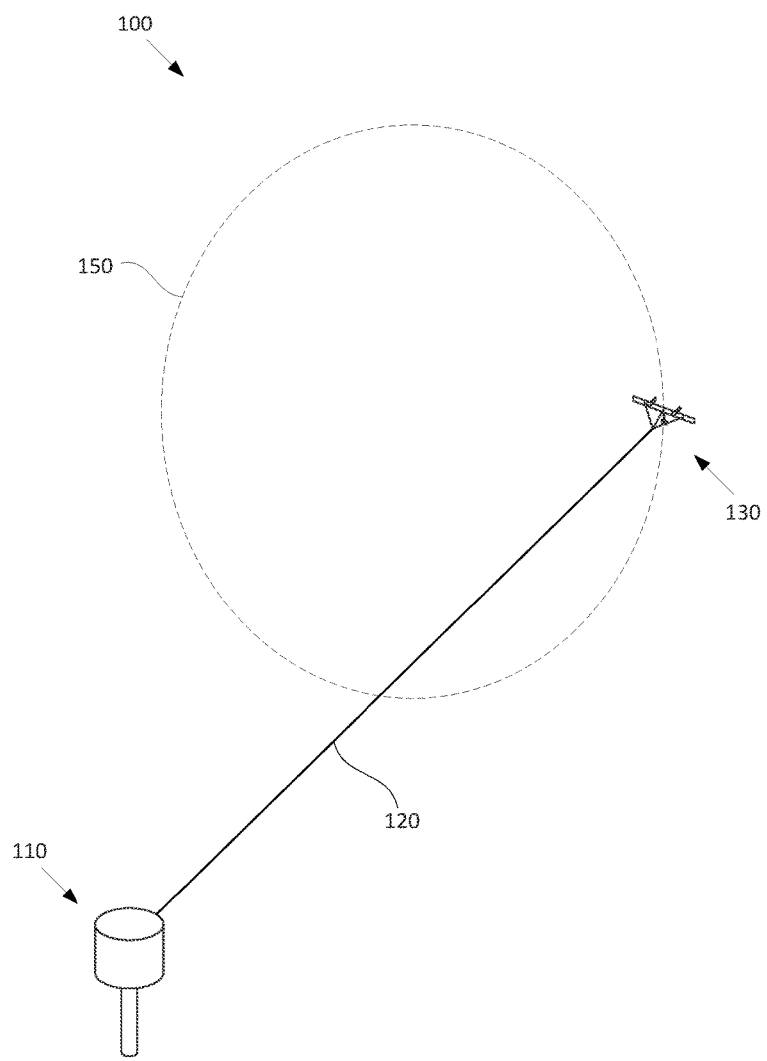
FIG. 1 depicts an Airborne Wind Turbine (AWT), according to an example embodiment.

Exemplary systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems can be arranged and combined in a wide variety of different configurations, all of which are contemplated herein.

I. Overview

Illustrative embodiments relate to components which may be used in a wind energy system, such as an Airborne Wind Turbine (AWT). In particular, illustrative embodiments may relate to or take the form of faired tethers with tail span sections that may be used in AWTs.

An AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. In some implementations, the ground station may transmit electricity to the aerial vehicle for take-off and/or landing.

In an AWT, an aerial vehicle may rest in and/or on a ground station (or a separate perch) when the wind is not conducive to power generation. When the wind is conducive to power generation, such as when a wind speed may be 3.5 meters per second (m/s) at an altitude of 200 meters, the ground station may deploy (or launch) the aerial vehicle. In addition, when the aerial vehicle is deployed and the wind is not conducive to power generation, the aerial vehicle may return to the ground station.

The aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight. Moreover, in crosswind flight, the aerial vehicle may be oriented such that the aerial vehicle may be propelled by the wind substantially along a closed path, which as noted above, may convert kinetic wind energy to electrical energy. In some implementations, one or more rotors of the aerial vehicle may generate electrical energy by slowing down the incident wind.

A tether may be utilized to connect the aerial vehicle to the ground station. Embodiments described herein relate specifically to tensile cables, which may be used as tethers in an AWT or for other applications (e.g., overhead power lines, towed sensor array cables, ROV tethers, undersea umbilicals, etc.). Tensile cables described herein are designed to act as both a tension member between two junction points and to transmit signals and/or electrical power. Tensile cable tethers may be configured to withstand one or more forces when an aerial vehicle is in flight (e.g., tension from aerodynamic forces acting on the aerial vehicle) and configured to transmit signals and/or electricity between the aerial vehicle and the ground station.

In a tensile cable, strength members (e.g., carbon fiber rods, aramid fibers, PBO fibers, UHMWPE fibers, etc.) that form a strength core are able to operate at high strains relative to transmission cables that are packaged together with them. When under a tension force, the strength core will typically elongate or stretch in length. In order to make use of the full elongation capabilities of the strength core while under stress, while not overloading or fatiguing the transmission cables in the tensile cable, conventional transmission cables are generally arranged in a helical pattern about the strength core. To relieve the strain of the helical cables, the helix must be able to squeeze together and/or contract. If the cables are wrapped around a stiff core (such as carbon fiber), a very high lay angle may be needed to reach the proper level of strain reduction. The total length of a conventional transmission cable in a helical lay is a function of the cosine of the lay angle. For an electrical conductor, the weight of electrical conductor needed for the same electrical resistance is a function of the square of the lay angle. For high lay angles, this can be a substantial weight penalty as the lay angle increases.

The tensile cable embodiments disclosed herein provide a strain-relieving arrangement with a much lower weight and length penalty compared to conventional helical arrangements. A strength core within the tensile cable provides high-tensile strength capability and one or more transmission cables in the tensile cable are arranged in an undulating ("wave") pattern. As the tensile cable stretches, the wavelength of the undulating pattern increases, and the amplitude of the undulation decreases such that an arc length along the undulation stays relatively constant; hence, the undulating transmission cable itself does not stretch (or stretches only minimally). Because the amplitude of the undulating transmission cable decreases, any mechanical supports for the transmission cable are preferably compliant enough to allow for this space compression between the transmission cable and any neighboring elements. The undulating arrangement is applicable in linear tension applications and in applications where there is a large mismatch in strains due to temperature swings and differences in thermal expansion, or strain from bending the tensile cable. An aspect ratio of the wavelength to the amplitude of the undulating wave pattern can be adjusted to achieve a desired level of strain relief.

In one embodiment, the plane of the undulation wave may intersect with the strength core center, or in another embodiment it may intersect with a tangent to the strength core OD, or some other plane. The plane may be constant along the length of the cable or the plane could slowly helix around or within the core. In one embodiment, the undulating conductor is external to the core and in another embodiment the undulating transmission cable may be within the core.

The strain-relieved transmission cables may be single elements or packaged together. For example, in DC transmission of electrical power, two conductors may be arranged as a side-by-side bundle in the undulation pattern. The paired transmission cables could be coextruded in "zipcord" fashion so that the transmission cables naturally bend in the plane of the wave. The two transmission cables may be arranged as two bundles of individually insulated conductors. This provides for a transmission cable pair capable of operating at a high voltage difference between the two bundles, and with a lot of insulation between the two bundles. However, within each bundle, each conductor is at a small voltage difference and only needs a small amount of insulation. This allows for communication signals and/or the ability to run individual power to each set of motors in an AWT aerial vehicle or other vehicle. Accordingly, embodiments described herein can save on electrical insulation mass by concentrating it between two conductor bundles, where it's really needed, and not between a group of individual conductors helixed together.

In one embodiment, the shape of the undulating wave may be a sine wave. In other embodiments, it may be a series of circular arcs, or another wave shape, including an asymmetric wave form. Over the length of the tensile cable, the wave form may vary and/or include straight portions.

The transmission cable(s) may be encased in a range of materials depending on how much lateral stiffness is necessary to support transfer of transverse compression to the core. For example, the undulating wave may be placed in a rigid channel, or a rigid shell may be arranged at or near the outside of a fairing, or stiff foam may be used to encase the conductors.

Deformable supports may be located along the transmission cable to help form the undulating path by providing mechanical support to the transmission cable to partially or completely define the undulating path. To aid compression of the supports when the undulating path stretches, additional elements, such as synthetic yarns, may be included in the undulating lay. The undulating lay may include other elements or combinations of elements as well, including a coax or fiber optic communication element alongside power conductors, and/or a foil or tape wrap or braid for shielding and/or lightning protection and/or grounding. A cord may be wrapped around the transmission cable and the strength core, and optionally one or more of the deformable supports to create the undulating pattern.

When arranging an undulating transmission cable in a faired tether, it may be preferable to put the transmission cable between the strength core and the leading edge of the faired tether. This would locate the center of gravity of the faired tether in a manner that would aid aerodynamic stability of the tether.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at three locations on the aerial vehicle 130. However, in other examples, the tether 120 may be attached at one or more locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the aerial vehicle 130 is possible. Further, the ground station 110 may be further configured to receive the aerial vehicle 130 during a landing. The ground station 110 may be formed of any material or materials that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a deployed length of the tether 120. For example, when the aerial vehicle 130 is deployed, the one or more components may be configured to pay out and/or reel in the tether 120. In some implementations, the one or more components may be configured to pay out and/or reel in the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electrical energy to the aerial vehicle 130 in order to power the aerial vehicle 130 for takeoff, landing, hover flight, and/or forward flight. The tether 120 may use materials that may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a strength core configured to withstand one or more forces of the aerial vehicle 130 when the aerial vehicle 130 is in hover flight, forward flight, and/or crosswind flight. In one example, the tether 120 may have a length of 100 meters or more.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of metal, plastic and/or other polymers. The aerial vehicle 130 may be formed of materials that allow for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150.

B. Illustrative Components of an AWT

Figure 2:
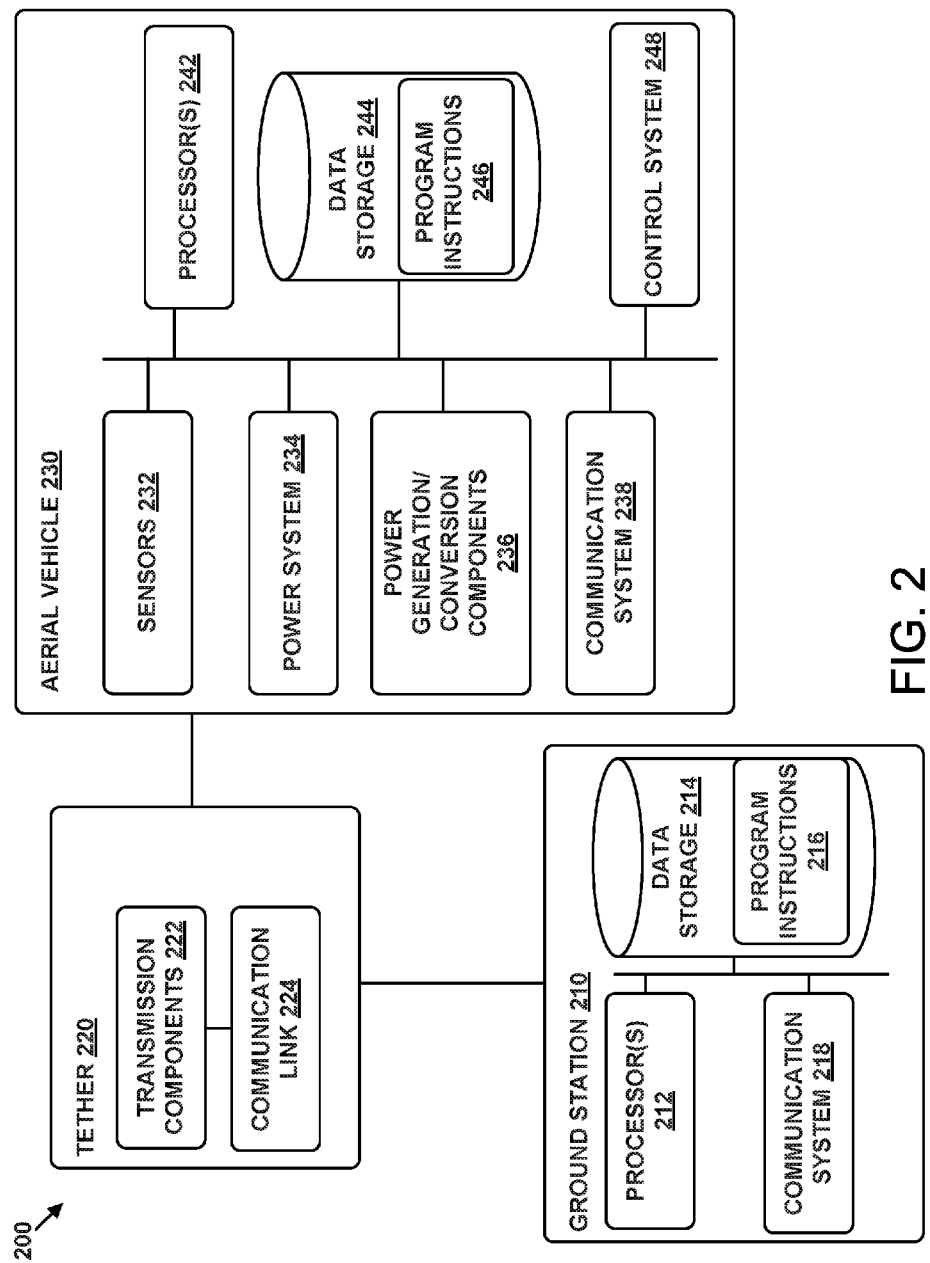
FIG. 2 is a simplified block diagram illustrating components of an AWT, according to an example embodiment.

FIG. 2 is a simplified block diagram illustrating components of an AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more electrical conductors that are configured to transmit electricity. And in at least one such example, the one or more electrical conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able to mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
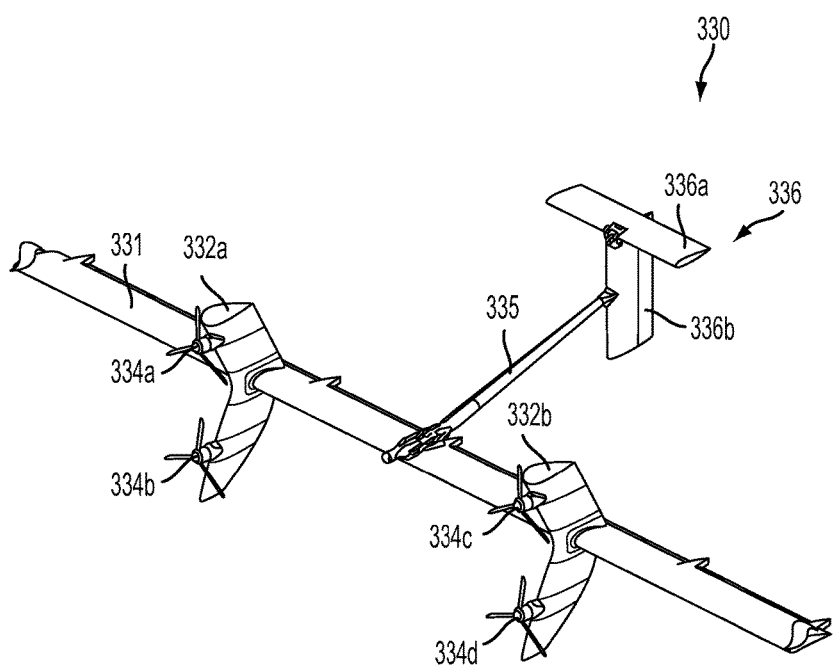
FIG. 3 depicts an aerial vehicle of an AWT, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332a, 332b, rotors 334a, 334b, 334c, 334d, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332a, 332b may be any suitable material for the aerial vehicle 330 to engage in hover flight, forward flight, and/or crosswind flight. For example, the main wing 331 and pylons 332a, 332b may include carbon fiber and/or e-glass, and include internal supporting spars or other structures. Moreover, the main wing 331 and pylons 332a, 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a, 332b may connect the rotors 334a, 334b, 334c, and 334d to the main wing 331. In some examples, the pylons 332a, 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust to the aerial vehicle 330 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 330 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336a and/or the vertical stabilizer 336b may be used to stabilize the aerial vehicle 330 and/or reduce drag on the aerial vehicle 330 during hover flight, forward flight, and/or crosswind flight. For example, the tail wing 336a and/or the vertical stabilizer 336b may be used to maintain a pitch of the aerial vehicle 330 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 330.

While the aerial vehicle 330 has been described above, it should be understood that the systems described herein could involve any suitable aerial vehicle that is connected to an airborne wind turbine tether, such as the tether 120 and/or the tether 220.

D. Aerial Vehicle Coupled to a Ground Station Via a Tether

Figure 4:
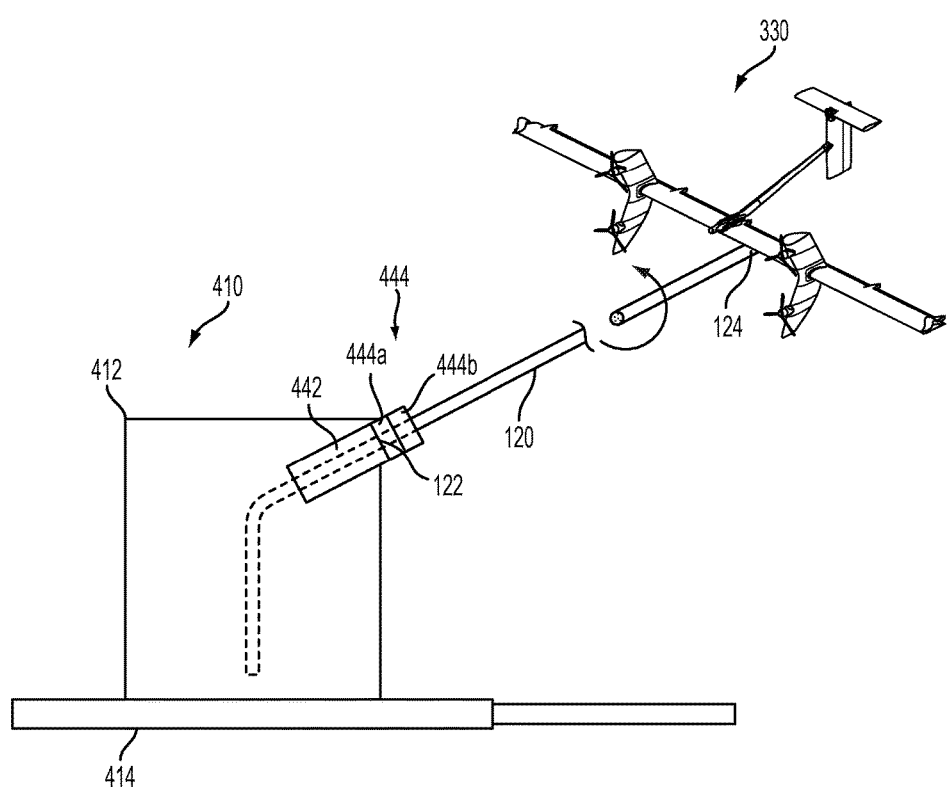
FIG. 4 depicts an aerial vehicle coupled to a ground station via a tether, according to an example embodiment.

FIG. 4 depicts the aerial vehicle 330 coupled to a ground station 410 via the tether 120, according to an example embodiment. Referring to FIG. 4, the ground station 410 may include a winch drum 412 and a platform 414. The ground station 110 and/or the ground station 210 may take the form of or be similar in form to the ground station 410. FIG. 4 is for illustrative purposes only and may not reflect all components or connections.

As shown in FIG. 4, the tether 120 may be coupled to a tether gimbal assembly 442 at a proximate tether end 122 and to the aerial vehicle 330 at a distal tether end 124. Additionally or alternatively, at least a portion of the tether 120 (e.g., at least one electrical conductor) may pass through the tether gimbal assembly 442. In some embodiments, the tether 120 may terminate at the tether gimbal assembly 442. Moreover, as shown in FIG. 4, the tether gimbal assembly 442 may also be coupled to the winch drum 412 which in turn may be coupled to the platform 414. In some embodiments, the tether gimbal assembly 442 may be configured to rotate about one or more axes, such as an altitude axis and an azimuth axis, in order to allow the proximate tether end 122 to move in those axes in response to movement of the aerial vehicle 330.

A rotational component 444 located between the tether 120 and the tether gimbal assembly 442 may allow the tether 120 to rotate about a long axis of the tether 120. The long axis is defined as extending between the proximate tether end 122 and the distal tether end 124. In some embodiments, at least a portion of the tether 120 may pass through the rotational component 444. Moreover, in some embodiments, the tether 120 may pass through the rotational component 444. Further, in some embodiments, the rotational component 444 may include a fixed portion 444a and a rotatable portion 444b, for example, in the form of one or more bearings and/or slip rings. The fixed portion 444a may be coupled to the tether gimbal assembly 442. The rotatable portion 444b may be coupled to the tether 120.

The use of the word fixed in the fixed portion 444a of the rotational component 444 is not intended to limit fixed portion 444a to a stationary configuration. In this example, the fixed portion 444a may move in axes described by the tether gimbal assembly 442 (e.g., altitude and azimuth), and may rotate about the ground station 410 as the winch drum 412 rotates, but the fixed portion 444a will not rotate about the tether 120, i.e., with respect to the long axis of the tether 120. Moreover, in this example, the rotatable portion 444b of the rotational component 444 may be coupled to the tether 120 and configured to substantially rotate with the rotation of tether 120.

Via the rotational component 444, the tether 120 may rotate about its centerline along the long axis as the aerial vehicle 330 orbits. The distal tether end 124 may rotate a different amount then the proximate tether end 122, resulting in an amount of twist along the length of the tether 420. With this arrangement, the amount of twist in the tether 420 may vary based on a number of parameters during crosswind flight of the aerial vehicle 330.

E. Illustrative Tensile Cables

Figure 5A:
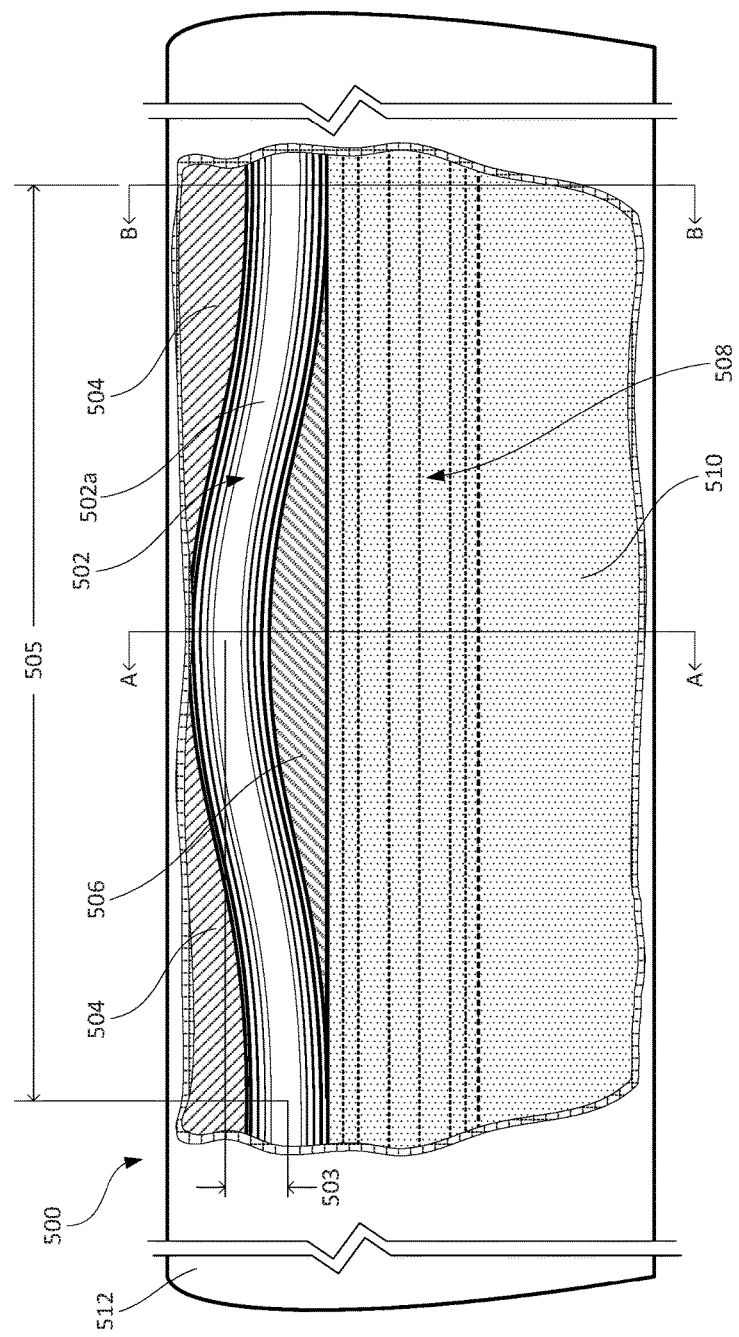
FIG. 5A depicts a partial cutaway view of a tensile cable, according to an example embodiment.

FIG. 5A depicts a partial cutaway view of a tensile cable 500, according to an example embodiment. The tether 120 and/or the tether 220 may take the form of or be similar in form to the tether 502. FIG. 5 and the remaining Figures depicting tensile cables are for illustrative purposes only and may not reflect all components or connections. Further, as illustrations, the Figures may not reflect actual operating conditions, but are merely to illustrate aspects of embodiments described. For example, while a perfectly straight tether may be used to illustrate a described tensile cable embodiment, during orbiting crosswind flight a tensile cable employed as an aerial vehicle tether may in practice exhibit some level of droop between the ground station and the aerial vehicle. Further still, the relative dimensions in the Figures may not be to scale, but are merely to illustrate the embodiments described.

As depicted, tensile cable 500 is illustrated as a faired tether, as described further with respect to Figures below. The tensile cable 500 includes a strength core 508 running longitudinally (i.e., along the length of the tensile cable 500) through the body. The core 508 may provide a significant contribution to the tensile strength and/or shear strength of the tether 500. The strength core 508 may include strength members 508A (illustrated in FIGS. 5B and 5C), which may take various forms in different embodiments. For example, in some embodiments, the core 508 may include pultruded fiber rod, carbon fiber rod (e.g., T700 or T800), dry strength fiber (e.g., poly p-phenylene-2, 6-benzoobisoxazole ("PBO")), fiberglass, one or more metals (e.g., aluminum), epoxy, and/or a combination of carbon fiber, fiberglass, and/or one or more metals. As one example, the core 508 may include a combination of fibers, such as a first carbon fiber having a first modulus and a second carbon fiber having a second modulus that is greater than the first modulus. As another example, the core 508 may include carbon fiber and fiberglass or epoxy. Further, the core 508 may include a matrix composite and/or carbon fiber and/or fiberglass, such as a metal matrix composite (e.g., aluminum matrix composite).

A fill material 510 in the tensile cable 500 may be solid (e.g., a vulcanizing rubber or silicone), or in another embodiment the fill material 510 may take the form of a non-solid structure (e.g., ribs, or various fill materials and voids). The fill material 510 may be uniform or may be comprised of various materials.

The illustrated tensile cable 500 includes an external jacket 512 that encases the internal elements. The illustrated jacket 512 is in the form of an airfoil shape (see FIGS. 5B and 5C for additional detail), with a leading edge and a trailing edge. As illustrated, the tensile cable 500 is a symmetric airfoil shape, such as a symmetric 4-digit NACA airfoil. In another embodiment, the tensile cable 500 may be a different shape, such a different symmetric airfoil or a cambered airfoil, such as a cambered 4-digit NACA airfoil. Additionally or alternatively, the airfoil shape of the tensile cable 500 may change along the length of the tensile cable 500. The airfoil shape may be integrally formed as part of the tensile cable 500 or may be the result in whole or in part of the jacket or other external component. Alternatively, in another embodiment, the tensile cable 500 may not be an airfoil shape; for example, it may be round or oval.

The tensile cable 500 includes a pair 502 of transmission cables 502a and 502b. The transmission cables 502a and 502b may be configured as electrical conductors to transmit electrical power. For example, the transmission cables 502a and 502b may be configured for high-voltage AC or DC power transmission (e.g., greater than 1,000 volts). As one example, the transmission cables 502a and 502b may be configured to carry an AC or DC voltage of between 1 kilovolt and 5 kilovolts, or higher, and an associated power transmission current of between 50 amperes to 250 amperes.

A series of upper and lower deformable supports, 504 and 506 respectively, are located on opposing sides of the pair 502 of transmission cables 502a and 502b along a longitudinal length of the tensile cable 500. In the illustrated tensile cable 500, the deformable supports 504 and 506 provide mechanical support to the transmission cables 502a and 502b and define an undulating path of the transmission cables 502a and 502b. As shown, the undulating path is in an untensioned condition, where no tension force is acting on opposing ends of the tensile cable 500, and where no internal expansion force is acting on the tensile cable 500. The former untensioned condition may occur, for example, if the tensile cable 500 is slack between a ground station and an aerial vehicle. The latter untensioned condition may occur, for example, if there is no thermal expansion of the transmission cables 502a and 502b. FIG. 5D, discussed below, reflects a tensioned condition.

In FIG. 5A, the undulating path of the transmission cables 502a and 502b has a maximum amplitude 503 and a wavelength 505. In response to an increase of a force acting on the transmission cables 502a and 502b, e.g. a tension force or an internal expansion force, the undulating path of the transmission cables 502a and 502b will reflect a smaller amplitude and an increased wavelength. This is accomplished through the deformability of the series of deformable supports 504 and 506, as further illustrated in FIG. 5D. As illustrated in FIGS. 5A and 5D, the deformable supports 504 and 506 are reversibly deformable so that the mating surfaces between the deformable supports 504 and 506 and the transmission cables 502a and 502b remain in contact and conform to each other as the transmission cables 502a and 502b move under tension and/or expansion forces. The deformable supports 504 and 506 are preferably rigid enough to provide mechanical support in both tensioned and untensioned conditions, and therefore affirmatively define the form of all or part of the undulating path. Preferably, the deformable supports 504 and 506 are a foam and/or foam/rubber material.

Elongation of the undulating path of the transmission cables 502a and 502b may alternatively deform only the upper deformable supports 504 or the lower deformable supports 506. In such an embodiment, the series of upper deformable supports 504 may have a different hardness (i.e., provide a different amount of mechanical support) than the series of lower deformable supports 506, such that one series deforms and the other does not. Alternatively, one series may deform more than the other series.

Figure 5B:
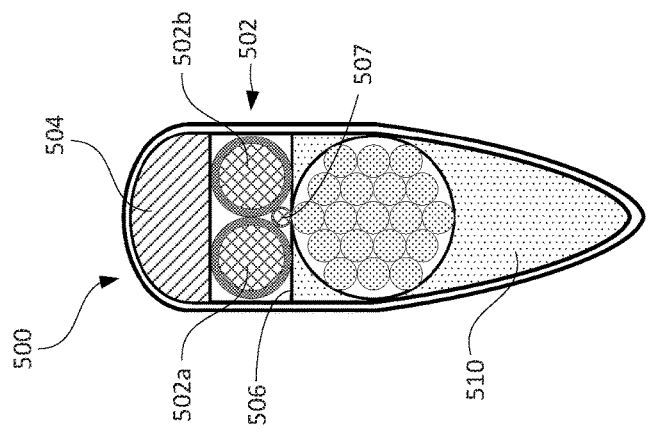
FIGS. 5B and 5C depict section views of the tensile cable in FIG. 5A (without cutaway), according to an example embodiment.
Figure 5C:
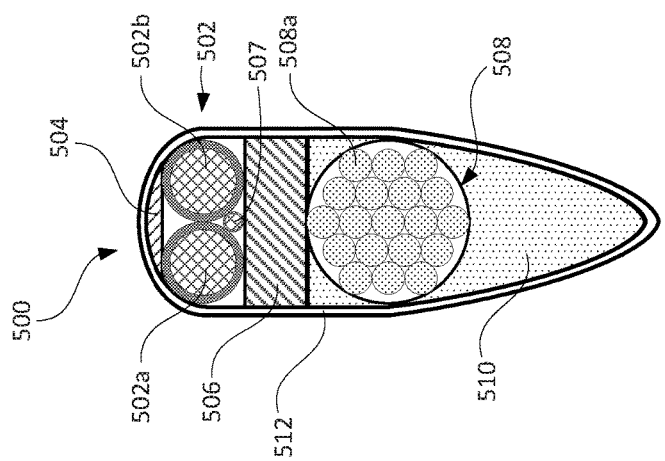

FIGS. 5B and 5C depict section views of the tensile cable 500 in FIG. 5A, without the jacket cutaway, according to an example embodiment. In these Figures, strength core 508 is illustrated as comprising multiple strength members 508a. This is an example embodiment only, and other configurations of strength core 508 are possible, including, but not limited to, a single strength member, different cross-sectional configurations, and different or no wraps or sleeves about the periphery of the strength core 508. Also illustrated in FIGS. 5B and C is the second transmission cable 502b, and each transmission cable 502a and 502b are illustrated as individually insulated single strand electrical conductors. Other configurations are possible as well. In another embodiment, the transmission cables 502a and 502b may be insulated from each other, but with a single integral insulation form. Alternatively or additionally, each transmission cable 502a and 502b may be formed as multiple strands and/or as a bundle of cables which one or more are individually insulated from other cables in the respective transmission cable. Additionally illustrated in FIGS. 5B and 5C is a third transmission cable 507, which may act as a signal cable. For example, transmission cable 507 may be a small-gauge electrical conductor or a fiber optic cable.

FIGS. 5A, 5B, and 5C reflect an arrangement where the transmission cables 502a, 502b, and 507 are located between a leading edge of the tensile cable 500 and the strength core 508. The amplitude of the undulating path of the transmission cables 502a, 502b, and 507 varies along a plane extending between the leading edge and the trailing edge (i.e., in a vertical direction according to the illustrations). Other arrangements are possible as well. For example, in another embodiment, a pair of transmission cables may be stacked vertically instead of side-by-side, and the undulating path may be orthogonal to the illustrated undulating path, such that the undulating path varies along a horizontal plane in FIGS. 5B and 5C (i.e., side-to side).

In the embodiment in FIGS. 5A, 5B, and 5C, the fill material 510 located between the strength core 508 and the trailing edge of the tensile cable. Additionally the fill material 510 encapsulates the outer periphery of the strength core 508, with a portion of the fill material 510 between the strength core 508 and the lower deformable support 506. Other embodiments are possible as well. For example, the fill material 510 may only be located between the strength core 508 and the trailing edge. Alternatively or additionally, the fill material 510 may comprise multiple elements, such as an element between the lower deformable supports 506 and the strength core 508 and a separate element near the trailing edge.

FIG. 5D depicts the partial cutaway view of the tensile cable 500 illustrated in FIG. 5A, except the tensile cable 500 is under tension. The undulating path of transmission cables 502a and 502b has stretched out, with a longer wavelength and a smaller maximum amplitude 503A as compared to the untensioned condition illustrated in FIG. 5A. The series of deformable supports 504 and 506 have compressed along their peaks and expanded at their troughs to conform to the surface of the transmission cables 502a and 502b. The rigidity of the material structure of the deformable supports 504 and 506 serves to at least partially define the undulating path by providing mechanical support that resists free movement of the transmission cables 502a and 502b as they are tensioned (or expand).

Figure 6B:
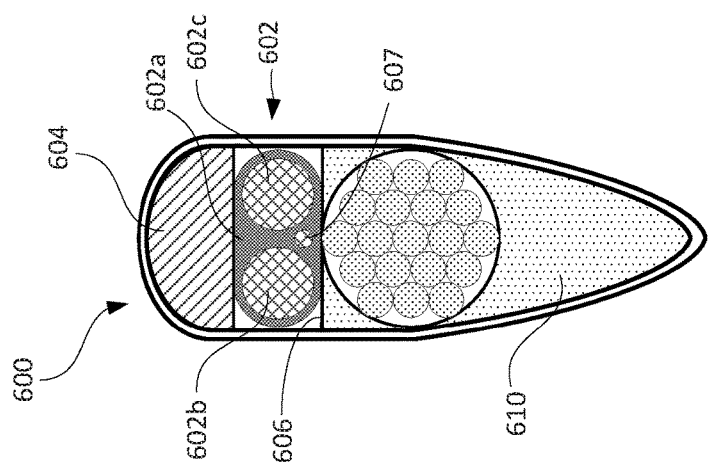
FIGS. 6A and 6B depict cross-section views of a tensile cable, according to an example embodiment.
Figure 6A:
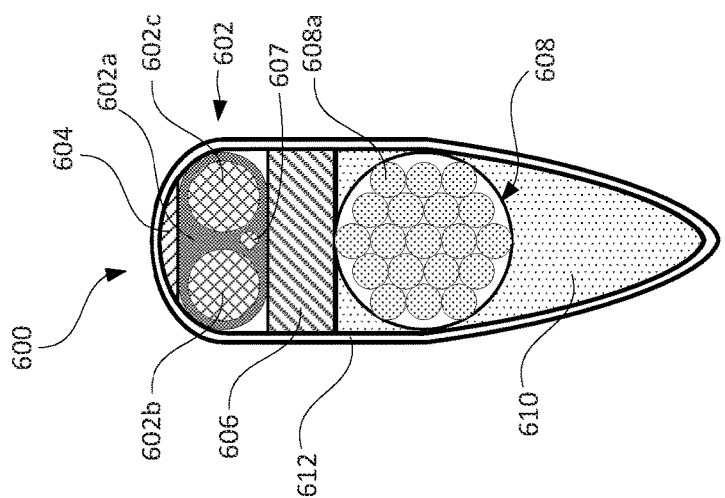

FIGS. 6A and 6B depict cross-section views of a tensile cable 600, according to an example embodiment. The cross-section views are arranged similarly to FIGS. 5B and 5C, respectively, and illustrate cross-sections at two different lengths along a length of tensile cable 600. Tensile cable 600 is similar to tensile cable 500 and include elements that are the same as, or similar to, components in tensile cable 500, such as: upper deformable supports 604, lower deformable supports 606, strength core 608 with strength members 608a, fill material 610, and jacket 612. Whereas FIGS. 5B and 5C illustrates two separately insulated transmission cables 502a and 502b, FIGS. 6A and 6C illustrate a different embodiment with a single insulated transmission cable 602 with separate conductors 602b and 602c separated by insulator 602a. Transmission cable 607 is also within the insulator 602a and may be, for example, an electrical signal cable or a fiber optic cable.

Figure 7:
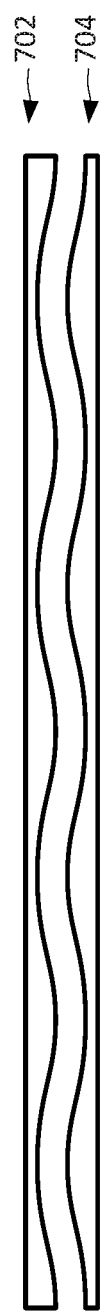
FIG. 7 depicts a side view of deformable supports, according to an example embodiment.
Figure 8:
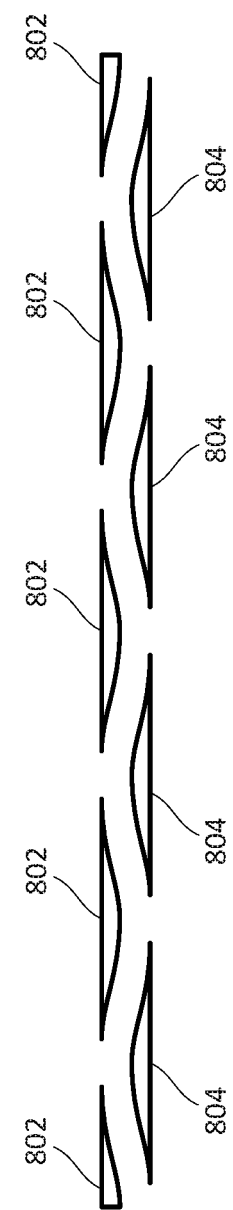
FIG. 8 depicts a side view of a plurality of deformable supports, according to an example embodiment.

FIGS. 7 and 8 illustrate two embodiments of deformable supports. FIG. 7 depicts a side view of an upper deformable support 702 and a lower deformable support 704 that may extend along a length of a tensile cable such as tensile cables 500 or 600. Instead of being an interrupted series of deformable supports, the deformable supports 702 and 704 are unitary structures that extend along multiple wavelengths of an undulating path. FIG. 8 depicts a side view of a series of upper deformable supports 802 and a series of lower deformable supports 804. Each of the deformable supports 802 and 804 may be located in a respective portion of an undulating path of transmission cables in a tensile cable such as tensile cables 500 or 600. As illustrated, each deformable support 804 is separated from the neighboring deformable support 804 (likewise for deformable support 802); however, in another embodiment, they may be directly adjacent to each other. In yet another embodiment (not shown), a combination of upper deformable support 702 and lower deformable supports 804 may be employed, or vice-versa.

Figure 9:
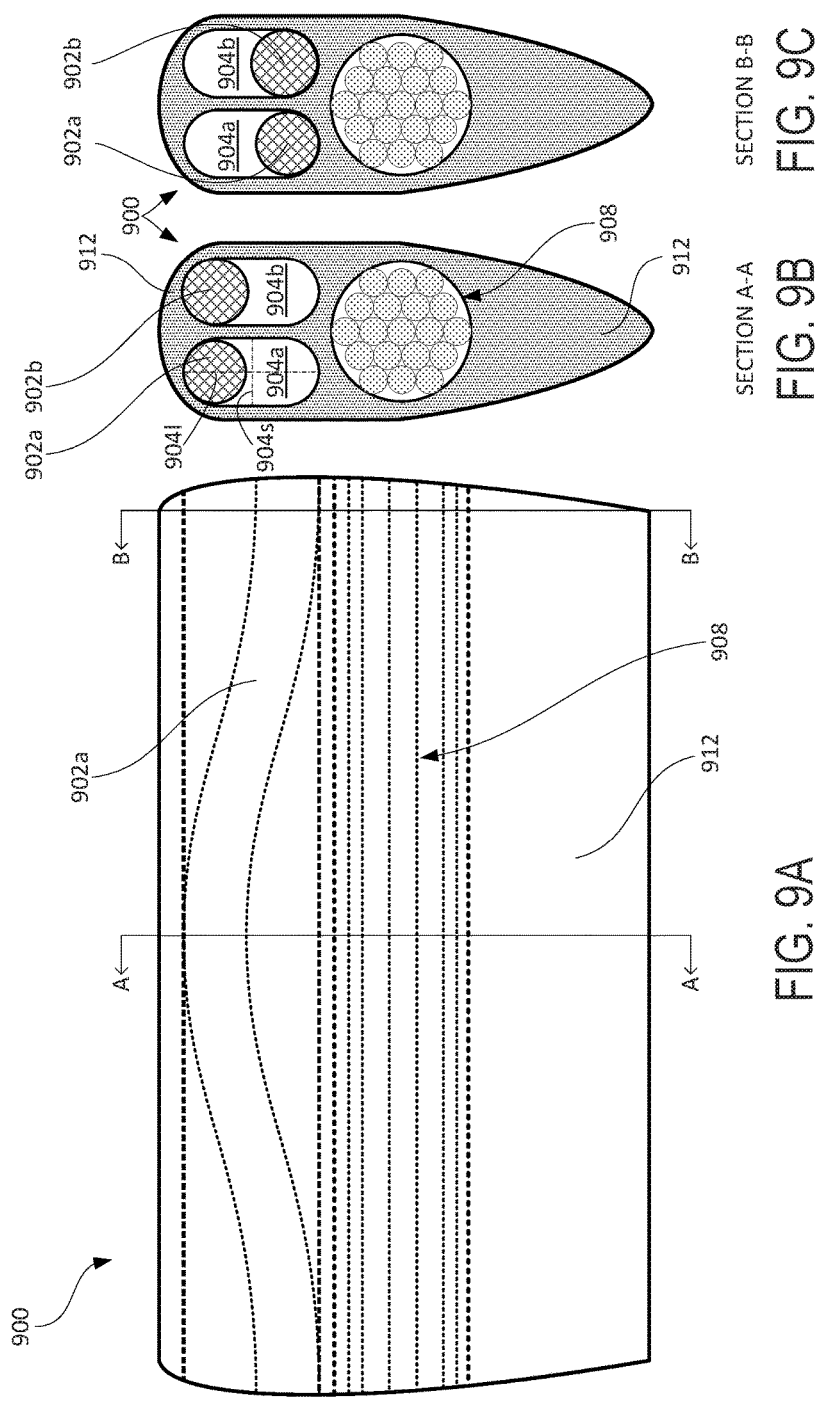
FIG. 9A depicts a tensile cable, according to an example embodiment.
FIGS. 9B and 9C depict section views of the tensile cable in FIG. 9A, according to an example embodiment.

FIGS. 9A, 9B, and 9C depict a tensile cable 900, according to another example embodiment. Tensile cable 900 may be similar to tensile cable 500 and 600. Transmission cables 902a and 902b are arranged in undulating paths within a body 912 of the tensile cable 900. A strength core 908 runs longitudinally through the body 912 and the transmission cables 902a and 902b are located between a leading edge of the tensile cable 900 and the strength core 908. Each of the transmission cables 902a and 902b are located within a respective elongated cavity 904a and 904b within the tensile cable 900. The elongated cavity 904a is illustrated with a transverse long axis 904l and a transverse short axis 904s orthogonal to the transverse long axis 904l, which may be considered axes along the height and width, respectively, of the elongated cavity 904a.

The transmission cable 902a is arranged in an undulating path with its amplitude varying along the transverse long axis 904l in response to a force (e.g., tension or expansion) acting on the transmission cable 902. The transmission cable 902a is constrained from movement along the transverse short axis 904s by the walls of the elongated cavity 904a. Transmission cable 902b and elongated cavity 904b are similarly arranged to transmission cable 902a and elongated cavity 904a. For illustrative clarity, elongated cavities 904a and 904b are illustrated without inclusion of deformable supports in the spaces between the transmission cables and the walls of the elongated cavities; however, deformable supports may be included within the elongated cavities 904a and 904b similarly to how the, for example, deformable supports 504 and 506 are arranged in relation the their respective transmission cables. Additionally, the optional deformable supports may be a series of deformable supports as illustrated in FIG. 8, or a continuous support as illustrated in FIG. 7.

Figure 10:
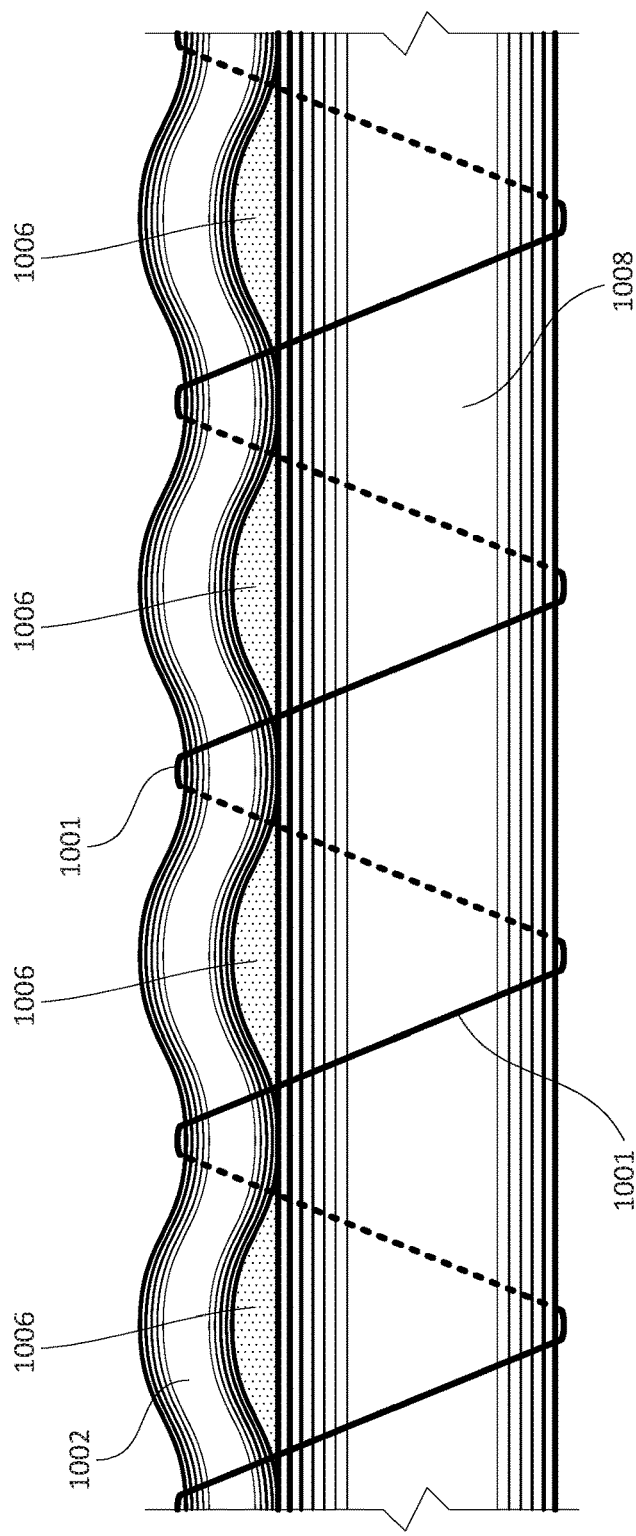
FIG. 10 depicts a binding arrangement for use in a tensile cable, according to an example embodiment.

FIG. 10 depicts a binding arrangement for use in a tensile cable, such as tensile cables 500 or 600, according to an example embodiment. A binding cable 1001 is wrapped around a transmission cable 1002 and a strength core 1008, and binds them together. The wrapping forms, or assists in forming, an undulating path for the transmission cable 1002. Additionally, as with lower deformable supports 506 and/or 606, a series of lower deformable supports 1006 may be located between the transmission cable 1002 and the strength core 1008. Alternatively, a continuous lower support, such as shown in FIG. 7, may be located between the transmission cable 1002 and the strength core 1008.

FIGS. 11A and 11B depicts another binding arrangement for use in a tensile cable, such as tensile cables 500 or 600, according to an example embodiment. A binding cable 1101 is wrapped around an upper deformable support 1104, a pair of transmission cables 1102a and 1102b, and a lower deformable support 1106, and binds them together. Alternatively, a series of upper and lower deformable supports, such as shown in FIG. 8, may be employed instead of continuous upper and lower deformable supports 1104 and 1106.

III. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A tensile cable comprising:
   a strength core arranged longitudinally within the tensile cable;
   a transmission cable arranged in an undulating path within the tensile cable, wherein an amplitude and a wavelength of the undulating path vary in relation to a force acting on the transmission cable;
   a first deformable support disposed between the transmission cable and the strength core; and
   a second deformable support disposed between the transmission cable and an outer layer of the tensile cable,
   wherein the first and second deformable supports are configured to provide mechanical support that at least partially defines the undulating path of the transmission cable, and wherein at least one of the first deformable support or the second deformable support is configured to reversibly deform in response to changes in the amplitude along a length of the transmission cable.

2. The tensile cable of claim 1, wherein either or both the first deformable support and the second deformable support comprise a foam material.

3. The tensile cable of claim 1, wherein first and second deformable conductors each comprise a mating surface that conforms to the undulating path of the transmission cable, wherein each respective mating surface comprises a convex shape and a concave shape.

4. The tensile cable of claim 1, wherein the transmission cable comprises an electrical conductor.

5. The tensile cable of claim 1, wherein the transmission cable comprises a plurality of electrical conductors electrically isolated from each other.

6. The tensile cable of claim 1, wherein the force is a tension force acting at opposing ends of the transmission cable.

7. The tensile cable of claim 1, wherein the force is an expansion force acting within the transmission cable.

8. The tensile cable of claim 1, wherein both the first deformable support and the second deformable support are configured to reversibly deform in response to changes in the amplitude along a length of the transmission cable.

9. The tensile cable of claim 1, wherein the reversible deformation comprises a compression or expansion along at least a portion of the respective deformable support.

10. The tensile cable of claim 1, further comprising an exterior surface of the tensile cable in the form of an airfoil shape, including a leading edge and a trailing edge, wherein the transmission cable is located between the leading edge and the strength core, and wherein the strength core is located between the transmission cable and the trailing edge.

11. The tensile cable of claim 10, wherein the amplitude of the undulating path varies along a plane extending between the leading edge and the trailing edge.

12. The tensile cable of claim 10, wherein the second deformable support is located between the leading edge and the transmission cable.

13. The tensile cable of claim 10, further comprising an outer jacket, wherein the outer jacket is formed around the first deformable support, the second deformable support, the transmission cable, and the strength core.

14. The tensile cable of claim 13, further comprising a fill material disposed between the strength core and an interior surface of the outer jacket.

15. The tensile cable of claim 14, wherein the fill material encapsulates an outer periphery of the strength core and a portion of the fill material is disposed between the strength core and the first deformable support.

16. The tensile cable of claim 1, wherein a cord is wrapped around, and binds together, the first deformable support, the transmission cable, and the second deformable support.

17. The tensile cable of claim 1, wherein a cord is wrapped around, and binds together, the transmission cable, the second deformable support, and the strength core.

18. A tensile cable comprising:
    a strength core arranged longitudinally within the tensile cable;
    a transmission cable arranged in an undulating path within the tensile cable, wherein an amplitude and a wavelength of the undulating path vary in relation to a force acting on the transmission cable;
    a first deformable support disposed between the transmission cable and a first interior surface of the tensile cable; and
    a second deformable support disposed between the transmission cable and a second interior surface of the tensile cable, wherein the second interior surface is disposed opposite the first interior surface,
    wherein the first and second deformable supports are configured to provide mechanical support that at least partially defines the undulating path of the transmission cable, and wherein at least one of the first deformable support or the second deformable support is configured to reversibly deform in response to changes in the amplitude along a length of the transmission cable.

19. A tensile cable comprising:
    a strength core arranged longitudinally within the tensile cable;
    a transmission cable arranged in an undulating path within the tensile cable, wherein an amplitude and a wavelength of the undulating path vary in relation to a force acting on the transmission cable;
    a first plurality of deformable supports disposed between the transmission cable and a first interior surface of the tensile cable; and
    a second plurality of deformable supports disposed between the transmission cable and a second interior surface of the tensile cable, wherein the second interior surface is disposed opposite the first interior surface,
    wherein the first and second pluralities of deformable supports are configured to provide mechanical support that at least partially defines the undulating path of the transmission cable, and wherein at least some of the deformable supports are configured to reversibly deform in response to changes in the amplitude along a length of the transmission cable.

* * * * *